United States Patent
Shah et al.

(10) Patent No.: US 10,579,132 B2
(45) Date of Patent: *Mar. 3, 2020

(54) SYSTEM AND METHOD FOR PERFORMING DISTRIBUTED POWER MANAGEMENT WITHOUT POWER CYCLING HOSTS

(71) Applicant: VMware, Inc., Palo Alto, CA (US)

(72) Inventors: Parth Shah, Mountain View, CA (US); Madhuri Yechuri, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/888,336

(22) Filed: Feb. 5, 2018

(65) Prior Publication Data
US 2018/0173299 A1 Jun. 21, 2018

Related U.S. Application Data

(63) Continuation of application No. 14/575,854, filed on Dec. 18, 2014, now Pat. No. 9,891,699.

(51) Int. Cl.
| | |
|---|---|
| G06F 1/00 | (2006.01) |
| G06F 1/26 | (2006.01) |
| G06F 1/3296 | (2019.01) |
| G06F 1/3206 | (2019.01) |
| G06F 1/329 | (2019.01) |
| G06F 1/3287 | (2019.01) |
| G06F 9/48 | (2006.01) |
| G06F 1/324 | (2019.01) |
| G06F 9/50 | (2006.01) |

(52) U.S. Cl.
CPC ............ *G06F 1/3296* (2013.01); *G06F 1/324* (2013.01); *G06F 1/3206* (2013.01); *G06F 1/329* (2013.01); *G06F 1/3287* (2013.01); *G06F 9/4856* (2013.01); *G06F 9/5094* (2013.01); *Y02D 10/126* (2018.01); *Y02D 10/17* (2018.01); *Y02D 10/171* (2018.01); *Y02D 10/172* (2018.01); *Y02D 10/20* (2018.01); *Y02D 10/24* (2018.01); *Y02D 10/30* (2018.01)

(58) Field of Classification Search
None
See application file for complete search history.

(56) References Cited

U.S. PATENT DOCUMENTS

| | | | |
|---|---|---|---|
| 2005/0060590 A1* | 3/2005 | Bradley | G06F 1/3203 713/320 |
| 2009/0086662 A1 | 4/2009 | Okada | |
| 2009/0249094 A1 | 10/2009 | Marshall et al. | |
| 2010/0070784 A1 | 3/2010 | Gupta et al. | |
| 2011/0213993 A1 | 9/2011 | Greenhalgh | |
| 2012/0226922 A1 | 9/2012 | Wang et al. | |

(Continued)

*Primary Examiner* — Nitin C Patel
(74) *Attorney, Agent, or Firm* — Thomas | Horstemeyer, LLP

(57) ABSTRACT

Power consumption by a first host included in a plurality of hosts in a clustered computing system, where each of the hosts executes one or more applications, is managed by detecting that a utilization level of the first host falls below a threshold value and, responsive to the detecting, migrating one or more applications executing on the first host to a second host. After the migration is completed, the first host is caused to consume less power while remaining powered on.

20 Claims, 4 Drawing Sheets

(56) References Cited

U.S. PATENT DOCUMENTS

2012/0304168 A1 11/2012 Raj Seeniraj et al.
2014/0215041 A1 7/2014 Mann et al.
2014/0237306 A1 8/2014 Kabakura

* cited by examiner

SYSTEM AND METHOD FOR PERFORMING DISTRIBUTED POWER MANAGEMENT WITHOUT POWER CYCLING HOSTS

CROSS-REFERENCE TO RELATED APPLICATIONS

This application is a continuation of, and claims priority to, U.S. Patent Application entitled "System and Method for Performing Distributed Power Management Without Power Cycling Hosts," filed on Dec. 18, 2014, and assigned application Ser. No. 14/575,854, now U.S. Pat. No. 9,891,699, which is incorporated herein by reference in its entirety.

BACKGROUND

Power management in large-scale datacenters is an important problem. Effective power management reduces both the operating costs of datacenters protects the environment from excessive greenhouse gas emissions. Virtualized datacenters are more energy efficient than physical datacenters due to the consolidation of virtualized computing resources on fewer physical servers. However, increases in the demand for computing power have given rise to additional power management features for virtualized computing platforms. Currently, vendors offer separate power management features that manager power consumption, respectively, for a computing cluster and for an individual host computer. For example, VMware, Inc. distributes Host Power Management (HPM) and Distributed Power Management (DPM) with its vSphere® software offering. HPM saves power by utilizing a processor's ACPI states (i.e., the processor's P-states and C-states) to dynamically place certain parts of the computer system into a reduced power state. By contrast, DPM redistributes VMs among physical hosts in a cluster, which enables some hosts to be powered off completely.

However, with DPM, application performance penalties can be high when the demand for VMs increases rapidly. This is due to the fact that DPM (and similar power management solutions) need to power on hosts that were previously powered off and then redistribute VMs to the newly powered on host. The powering on of a host entails a great deal of delay, as the host components (processors, memory, and storage devices) must become active, and the operating system of the host and applications must be reloaded. This stands in contrast with the relatively small delays experienced with HPM, as modifying P-states and C-states does not involve the same degree of latency. However, HPM focuses only on a single host computer and lacks the cluster power management capabilities of DPM.

SUMMARY

A method of managing power consumption by a first host included in a plurality of hosts in a clustered computing system is provided, where each of the hosts executes one or more applications therein. The method comprises the steps of detecting that a utilization level of the first host falls below a threshold value and, responsive to the detecting, migrating one or more applications executing on the first host to a second host. The method further comprises the step of issuing an instruction that causes the first host to consume less power while the first host remains powered on.

Further embodiments provide a non-transitory computer-readable medium that includes instructions that, when executed, enable a host computer to implement one or more aspects of the above method and a clustered computing system that includes a management server and a plurality of hosts, including a first host, where the management server and first host are programmed to implement one or more aspects of the above method.

DETAILED DESCRIPTION

Figure 1:
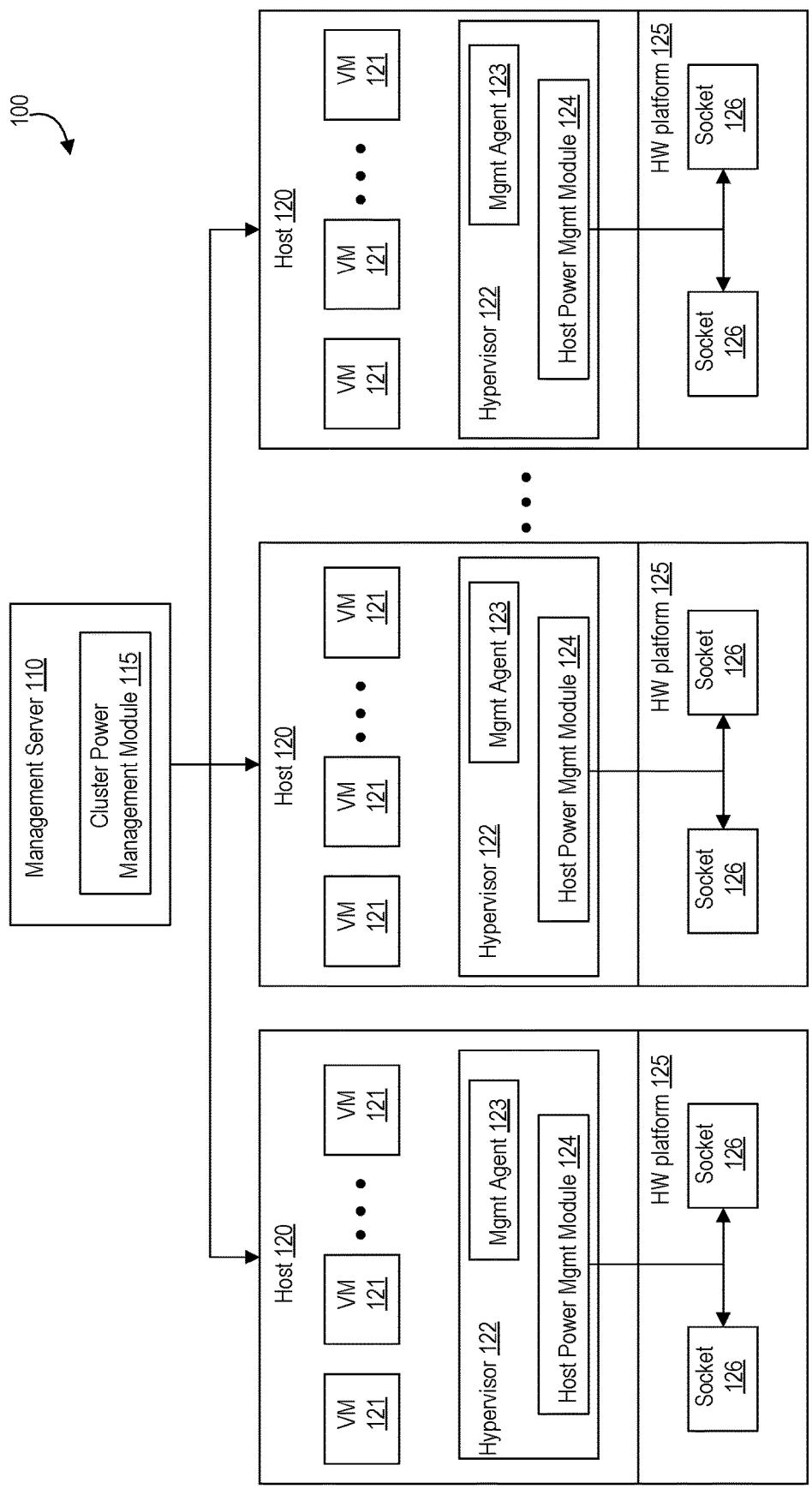
FIG. 1 is a conceptual diagram that depicts a computing system in which one or more embodiments may be implemented.

FIG. 1 is a conceptual diagram that depicts a computing system 100 in which one or more embodiments may be implemented. Computing system 100 includes a plurality of host computers (i.e., hosts) 120. In the embodiment shown in FIG. 1, each host 120 is a computing device in which virtualization software and a plurality of virtual machines (VMs) are executing. Each host 120 is typically a server-class computer, although, in some embodiments, hosts 120 may include a variety of classes of computers, such as mainframe computers, desktop computers, and laptop computers.

As shown, each host 120 includes one or more VMs 121. Each VM 121 is a software emulation of a physical computing system. Each VM 121 is capable of running one or more applications under the control of a guest operating system (not shown), where the guest operating system provides various operating system services (such as central processing unit (or CPU) allocation and memory management). The guest operating system interacts with a virtual hardware platform, which is an emulated hardware platform for the corresponding VM. Virtual hardware platforms (not depicted in the figure) typically comprise virtual CPUs, virtual random access memory (or RAM), virtual disks, and, for network communication, a virtual network interface controller (or NIC). Applications that execute within VMs 121 are generally unaware that they are executing in a virtual machine. Thus, such applications may be installed in a VM 121 unchanged from how such applications would be installed on a physical computer.

Similarly, the guest operating system installed in each VM 121 is generally unaware that it is executing on top of a virtualized hardware platform, rather than a physical hardware platform. Thus, the guest operating system may be installed in a VM 121 in the same manner that the guest operating system is installed on a physical computer. Examples of guest operating system include the various versions of Microsoft's Windows® operating system, the Linux operating system, and Apple's Mac OS X.

Each VM 121 accesses computing services by interacting with a virtual hardware platform. The virtual hardware platform for each VM 121 is implemented by a hypervisor 122. As shown, each host 120 has one hypervisor 122 executing therein. Hypervisor 122 provides a virtualization platform on which VMs 121 execute. Hypervisor 122 enables each VM 121 that executes under its control to access physical computing resources in host 120. Thus, when the guest operating system of a VM 121 schedules a process to be run on a virtual CPU of the virtual hardware platform, hypervisor 122 schedules the virtual CPU of that VM 121 to run on a physical CPU of host 120. In another example, an application executing in a VM 121 may require additional virtual RAM in order to execute a particular function. The application would issue a memory allocation request to the guest operating system, which would allocate an amount of virtual RAM to satisfy the request. In turn, hypervisor 122 would allocate a certain amount of physical RAM that corresponds to the allocated virtual RAM.

Hypervisor 122 also manages the physical computing resources of the corresponding host 120, and allocates those resources among the executing VMs 121, as well as other (i.e., non-VM) processes. Hypervisor 122 allocates physical CPU time to virtual CPUs in the VMs 121, as well as physical disk space to virtual disks for each of the VMs 121. Hypervisor 122 also enables the transmission and receipt of network traffic (through the virtual NICs) for each VM 121.

The physical computing resources of each host 120 (which are managed by the hypervisor 122 that executes therein) are depicted in FIG. 1 as hardware platform 125. Although not depicted in FIG. 1, each hardware platform 125 includes physical RAM, a host bus adapter (which enables external storage devices to be connected to the host 120), and one or more physical NICs (which enables host 120 to communicate over a network). As shown in the figure, hardware platform 125 also includes one or more sockets 126. As described in further detail below, a socket 126 corresponds to a physical connector to which a multi-CPU chip (or "multi-core" chip) may be connected to a motherboard in hardware platform 125. Each socket 126 may also include a local memory, often referred to as a non-uniform memory access (or NUMA) memory unit. NUMA memory is used in multiprocessor configurations in order to address performance issues that arise when several processors attempt to simultaneously access as single shared memory.

In managing the computing resources of a host 120, one of the functions performed by hypervisor 122 is power management. In one or more embodiments, hypervisor 122 includes a host power management module 124 to perform this task. Among the functions performed by host power management module 124 is assessing whether the corresponding host 120 may be placed in a reduced power mode. Host power management module 124 makes a determination that the corresponding host 120 has a reduced system workload relative to the available physical resources available to handle that reduced workload. When host power management module 124 determines that available computing resources on host 121 exceed what is necessary to execute the workload on host 121, then host power management module 124 proceeds to place host 121 in a reduced power consumption state. Thus, as shown in FIG. 1, host power management module 124 accesses one or more sockets 126 in order to reduce power consumption by the CPUs that execute on those sockets. The techniques implemented by host power management module 124 are provided in further detail below.

Computing system 100 also includes a management server 110. Management server 110 runs on a computer host that is separate from hosts 120 (which are referred to as managed hosts). Management host 110 is accessible by a system administrator via a graphical user interface (GUI) or via a command line interface (CLI). In typical embodiments, a system administrator accesses management server 110 to perform various management functions for computing system 100. For example, management server 110 deploys VMs 121 to the different hosts 121. Management server 110 also provides for the powering on and powering down of VMs, as well as the monitoring of the performance of the VMs. As shown in FIG. 1, management server 110 also includes a cluster power management module 115.

Cluster power management module 115 is software that manages power consumption across an entire cluster of host computers (such as computing system 100). Cluster power management module 115 communicates with the hypervisor 122 of each host 120 in computing system 100. Communication is performed via a management agent 123, which is another component of hypervisor 122. Management agent 123 receives requests from management server 110 (and, by extension, cluster power management module 115) and performs various functions in response to these requests. In some embodiments, cluster power management module 115 transmits messages over a network that connects management server 110 with hosts 120. In other embodiments, cluster power management module 115 issues remote procedure calls (RPCs) that are transmitted to one or more management agents 123. In such embodiments, management agent 123 receives the message corresponding to the RPC and executes one or more routines in response.

As described further below, cluster power management module 115 monitors overall system utilization (e.g., CPU utilization, RAM utilization, and network utilization) for each of the hosts 120 in computing system 115. This monitoring is also performed via communication between cluster power management module 115 and one or more management agents 123. When a particular host 120 is underutilized (e.g., CPU utilization and the like falls below a certain threshold utilization value), then cluster power management module 115 determines that the given host is a candidate for being "powered down." In prior implementations, this powering down of a host 120 entailed placing the host in a standby mode, which involves removing power from most system components (CPU, RAM, and the like) while maintaining a small amount of power available to the host in order to run an agent that is configured to receive a message requesting the host to leave standby mode (i.e., to be "powered up"). However, prior to placing host 120 into standby mode, cluster power management module 115 migrates the current workload (i.e., VMs 121) being executed by the host 120 to another host 120 (i.e., a host 120 having sufficient available computing resources to handle the workload from the host to be powered down).

However, it should be noted that placing a host 120 into a standby mode has drawbacks. Although power consumption on the powered down host is kept to a minimum (thereby resulting in cost savings with respect to energy usage), returning the powered down host from standby mode to an active mode is often a slow process. First, power must be returned to the various system components (CPUs, RAM, and the like) from which power was withdrawn. In addition, data that was evicted from RAM and CPU registers when host 120 was placed in standby mode must be subsequently returned. Therefore, according to embodiments, cluster power management module 115 communicates with host power management module 124 (via management agent 123) in order to place a host 120 from which VMs 121 have been migrated into a reduced power consumption mode, where, when the host returns from the reduce power consumption mode to a fully active state, experiences a smaller degree of latency than the latency experienced when returning from a full standby mode.

It should be noted that the embodiment described in FIG. 1 includes hosts 120 that have VMs 121 executing on top of a hypervisor 122. However, in other embodiments (not depicted) the host operating system that runs directly on host 120 implements what is referred to as "operating system-level virtualization." In such embodiments, a hypervisor is not required to present a virtualized hardware platform. Such embodiments do not include VMs 121. Rather, these embodiments include what are referred to as containers, which are applications and data that execute directly on top of the host operating system. The host operating system isolates these containers from one another using built in virtualization functionality. Unlike VMs, containers do not require (and do not support) installation of a guest operating system therein.

Figure 2:
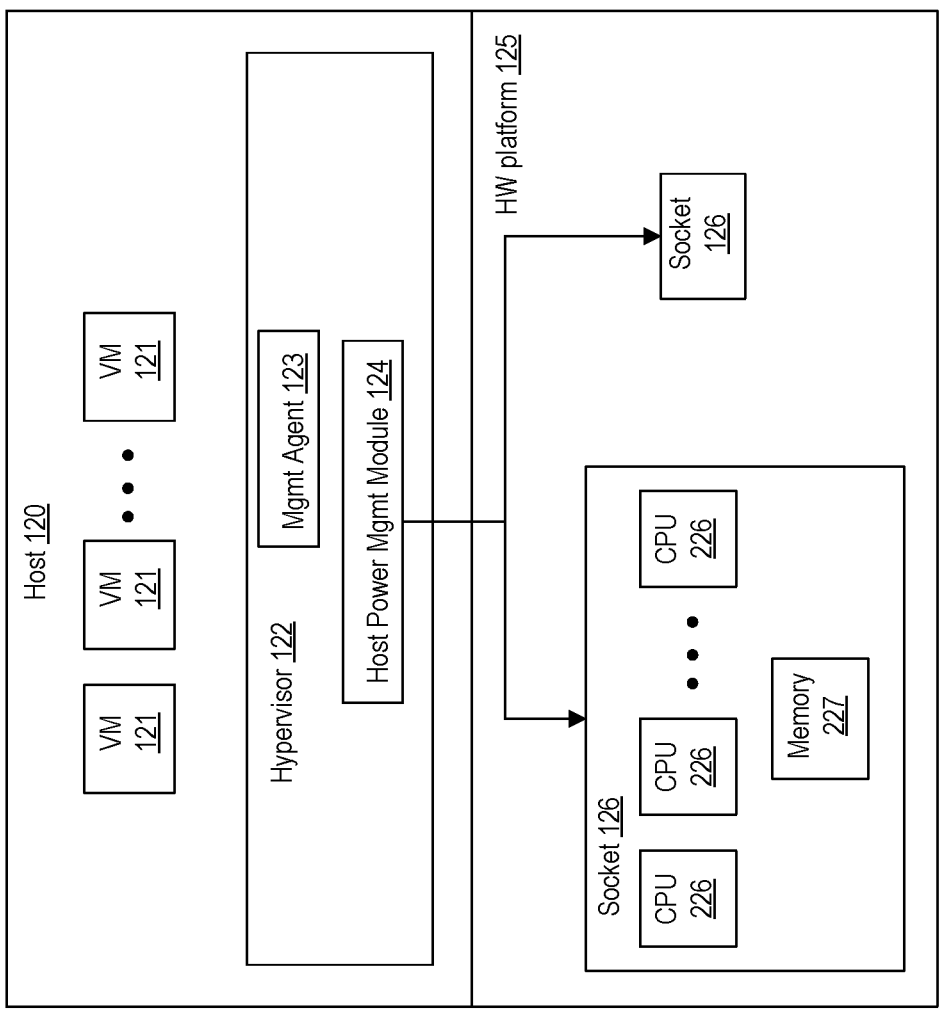
FIG. 2 is a conceptual diagram that depicts an expanded view of the hardware platform of a computer host, according to one or more embodiments.

FIG. 2 is a conceptual diagram that depicts an expanded view of a host 120, according to one or more embodiments. As shown in FIG. 2, host 120 includes a hardware platform 125 having two sockets 126. Each socket 126 may be thought of as a connection point for a plurality of CPUs (depicted as CPUs 226). The CPUs 226 may, in some embodiments, be included as separate processing cores on a multiprocessor computer chip. For example, most desktop computers (which tend to be single-processor computers) have a single socket providing connectivity for a single-core processor to the motherboard. A server computer, on the other hand (such as host 120 depicted in FIG. 2) has multiple sockets 126, where each socket 126 provides connectivity for multiple processors to a motherboard embodied in hardware platform 125.

As shown, each socket 126 also provides for a local memory 227. As mentioned earlier, memory 227 may be a NUMA memory device. In a NUMA memory configuration, each group of CPUs (i.e., CPUs 226 in a single socket 126) has its own memory, and possibly its own I/O channels. However, each CPU can access memory associated with the other groups of CPUs. Each group of CPUs is typically called a NUMA node.

In NUMA memory configurations, because CPUs use local memory and foreign memory, it typically takes longer for a CPU to access some regions of memory than others. Local memory and foreign memory are typically used in reference to a currently executing process on a CPU. Local memory is the memory that is on the same node as the CPU currently executing the thread. Memory that does not belong to the node on which the thread is currently running is foreign, sometimes referred to as remote memory. There is often a cost to access foreign memory that is above that for local memory. Thus, applications that are note "NUMA aware" may perform poorly on NUMA hardware.

As shown in FIG. 2, host power management module 124 accesses sockets 126 in order to control how much power host 120 consumes. As described below, host power management module 124 performs one or more power management operations on the CPUs 226 that are configured on a socket 126 in order to place host 120 in a lower power consumption mode.

Figure 3A:
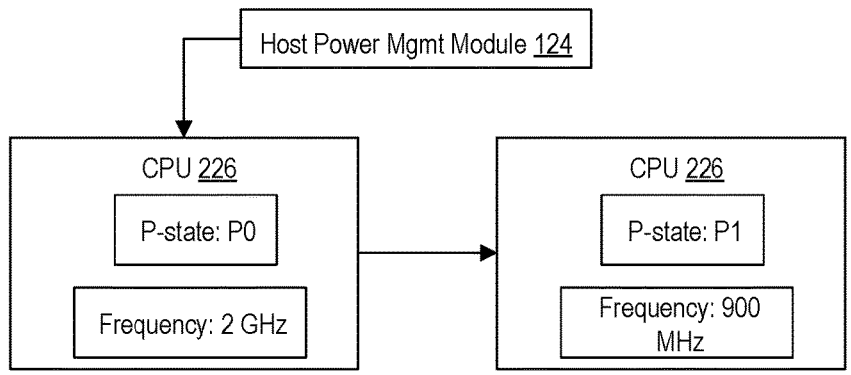
FIGS. 3A and 3B depict power management operations performed on a computer host by a host power management module, according to one or more embodiments.
Figure 3B:
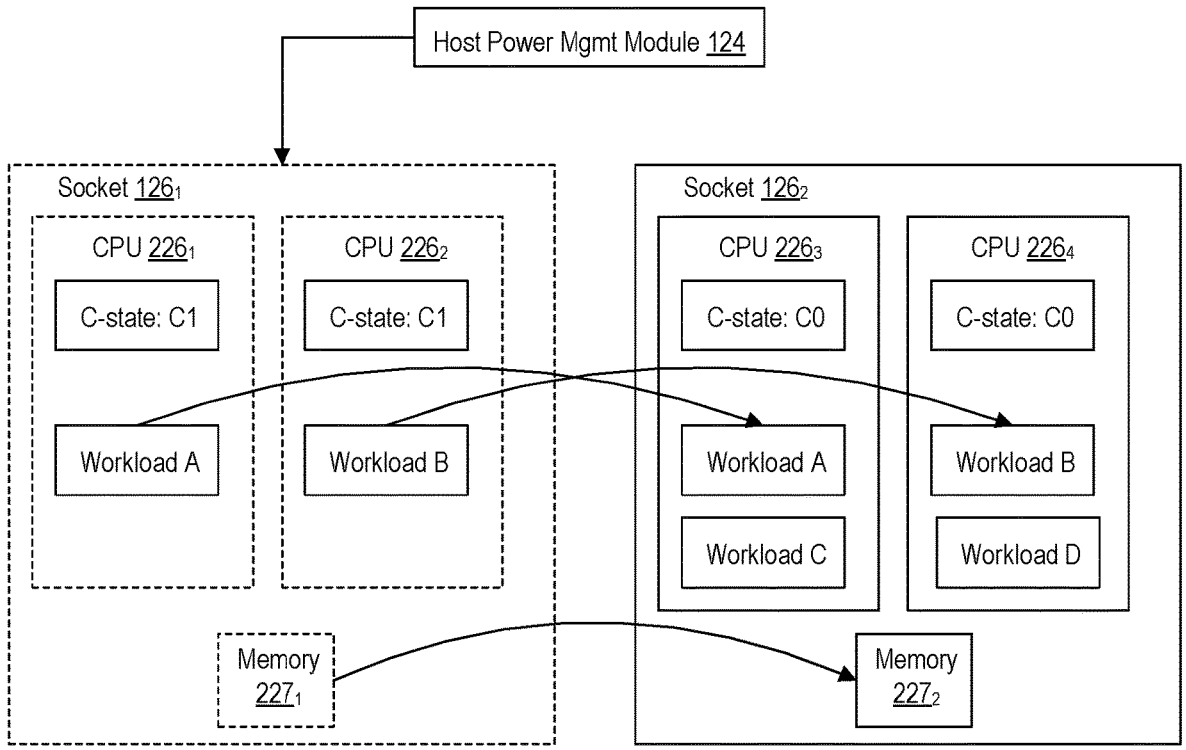

FIGS. 3A and 3B depict power management operations performed by host power management module 124, according to one or more embodiments. FIGS. 3A and 3B differ in that FIG. 3A depicts a frequency scaling operation for a particular CPU 226, while FIG. 3B depicts placing CPUs 226 in a deep "sleep" state.

In FIG. 3A, host power management module 124 adjusts the power consumption of a host 120 by modifying the P-state of a CPU 226. According to one or more embodiments, while CPU 226 executes instructions, CPU 226 may operate in one of several CPU performance states (or "P-states"). P-states are operational states that relate to CPU frequency and voltage. In general, the higher the P-state, the lower the frequency and voltage at which CPU 226 executes. The number of P-states that any particular CPU may execute in is specific to that processor type and implementation of P-states differs across different processor types.

In virtually all CPU types, P0 is the highest-performance state, while higher P-state numbers represent slower processor speeds and lower power consumption. For example, a processor in P-state P3 runs more slowly and uses less power than a processor running in P-state P1. To operate at any P-state, the processor must be in an active state (i.e., the processor must be in a non-idle state). CPU P-states are defined in the Advanced Configuration and Power Interface (ACPI) specification.

As shown in FIG. 3A, host power management module 124 issues a command to CPU 226 such that CPU 226 transitions from P-state P0 to P-state P1. In P-state P0, CPU 226 operates at a frequency of 2 Gigahertz (GHz), while at P-state P1, CPU 226 operates at a frequency of 900 Megahertz (MHz). One example of a power management command is the cpupower command, which is available in the Linux operating system. Another command is the POWER-CFG command, available in Windows Server environments. Host power management module 124 is informed by cluster power management module 115 (via management agent 123) that the particular host 120 on which host power management module 124 executes should be run in a reduced power consumption state. In FIG. 3A, host power management module 124 (in response to being so informed by cluster power management module 115) determines that the optimal action to take is to place CPU 226 into a state where it operates in a lower operating frequency. In some embodiments, host power management module 124 maintains a power management policy file that contains policy guidelines concerning the conditions under which power management is to be performed by adjusting the P-states of one or more CPUs.

In FIG. 3B, host power management module 124 adjusts the power consumption of a host 120 by modifying the C-state of one or more CPUs 226. According to embodiments, C-states of CPUs 226 are core power states that are controlled by host power management module 124, and which define the degree to which a particular CPU 226 is "sleeping." The C0 C-state indicates that the corresponding CPU 226 is active and is operating normally. All other C-states (e.g., C1 to Cn) define states in which the processor clock is inactive (i.e., the processor cannot execute instructions) and where different parts of the processor are powered down. Deeper C-states (C-states having larger numerical values) have longer exit latencies (i.e., the time to transition back to C-state C0). This is due to the fact that, in deeper C-states, power is removed from more components of the processor. However, deep C-states save more processor power.

In FIG. 3B, host power management module 124 issues one or more commands to place CPUs 226 on host 120 into a sleep state in order to conserve power usage on host 120. In the example depicted, two sockets (socket $126_1$ and $126_2$) are included on host 120. Socket $126_1$ has two CPUs, CPU $226_1$ and CPU $226_2$. As shown, CPU $226_1$ executes a first workload (workload A), while CPU $226_2$ executes a second workload (workload B). Workloads A and B may be application or operating system (e.g., hypervisor) processes. In one or more embodiments, workloads A and B may correspond to virtual CPUs of VMs executing on host 120.

Host 120 also includes socket $126_2$. As shown, socket $126_2$ has two CPUS, CPU $226_3$ and $226_4$. CPU $226_3$ executes a workload (workload C) and CPU $226_4$ executes a workload (workload D). As was the case for workloads A and B, workloads C and D may correspond to application or operating system processes, and may correspond to virtual CPUs executing on host 120.

Prior to host power management module 124 issuing any power management commands to any of the depicted CPUs, each of CPUs $226_1$, $226_2$, $226_3$, and $226_4$ operates in C-state C0, which, as previously mentioned, is a fully active and operational state. As shown in the figure, host power management module 124 issues a command to the CPUs executing on socket $126_1$ to place those CPUs in a deeper C-state (i.e., a "sleep" state). As was the case in FIG. 3A, host power management module 124, in FIG. 3B, issues the command in response to receiving (via management agent 123) a message from cluster power management module 115. As previously mentioned, cluster power management module 115 determines overall utilization among the hosts 120 in computing system 100 and, based on the determined utilization, decides which hosts 120 should have VMs migrated from them and then, after such migration, powered off.

In FIG. 3B, host power management module 124 receives the message from cluster power management module 115 and determines the optimal power saving measures to take. In this instance, host power management module 124 determines that the optimal power saving measure is to place CPUs $226_1$ and $226_2$ into a deeper C-state (i.e., a C-state other than state C0). It should be noted that the determination as to what power saving measure should be taken is determined by host power management module 124. That is, cluster power management module 115 does not take part in this determination. Rather, cluster power management module 115 determines that utilization on a host 120 (e.g., CPU utilization, memory utilization, or network utilization) falls below a certain threshold and that, as a result, one or more VMs may be migrated away from that host 120. Cluster power management module 115 then informs host power management module 124 to perform operations to place host 120 into state where host 120 consumes less power.

As shown in FIG. 3B, at the time host power management module 124 is ready to issue the power saving command to the CPUs on socket $126_1$, CPU $226_1$ executes a workload (workload A) and CPU $226_2$ executes another workload (workload B). Thus, prior to issuing the power saving command to each of CPUs $226_1$ and $226_2$, host power management module 124 migrates each of these workloads to CPUs that are not being placed in a lower power consumption (or "sleep") state. The CPUs that are to remain in an active state (i.e., C0 C-state) are CPUs $226_3$ and $226_4$, which are executing on socket $126_2$. This migration of workload is depicted by the arrows in FIG. 3B that extend from socket $126_1$ to socket $126_2$. Thus, workload A is migrated to run on CPU $226_3$ (along with workload C), while workload B is migrated to run on CPU $226_4$ (along with workload D). As mentioned, each of these workloads may correspond to application processes or operating system processes. Further, the workloads may correspond to virtual CPUs of VMs executing on host 320 that remain after cluster power management module 115 migrates one or more VMs from host 320.

In the embodiment shown in FIG. 3B, host power management module 124 also migrates data stored in memory $227_1$ to memory $227_2$. This migration takes place because each of the CPUs on socket $126_1$ (i.e., CPUs $226_1$ and $226_2$) are placed in a sleep state and, therefore, no longer require the use of memory $227_1$. However, since workloads A and B are still active and running (i.e., after being migrated to CPUs $226_3$ and $226_4$), the data that those workloads access may still be required. Thus, since memory $227_2$ is a local NUMA memory element for CPUs $226_3$ and $226_4$, host power management module 124 migrates the data for workloads A and B to memory $227_2$.

Once the workloads are migrated from CPUs $226_1$ and $226_2$, and the data for those workload are migrated from memory $227_1$ to memory $227_2$, host power management module 124 places CPUs $226_1$ and $226_2$ in a deeper C-state. In FIG. 3B, the CPUs are placed in C-state C1. Further, power to the hardware elements on socket $126_1$ is curtailed, which is indicated by the dotted outlines for those elements. As shown in the figure, this includes memory $227_1$, which is a NUMA memory element that is local to CPUs $226_1$ and $226_2$. It should be noted that power is still delivered to CPUs $226_3$ and $226_4$, and memory $227_2$, on socket $126_2$.

Figure 4:
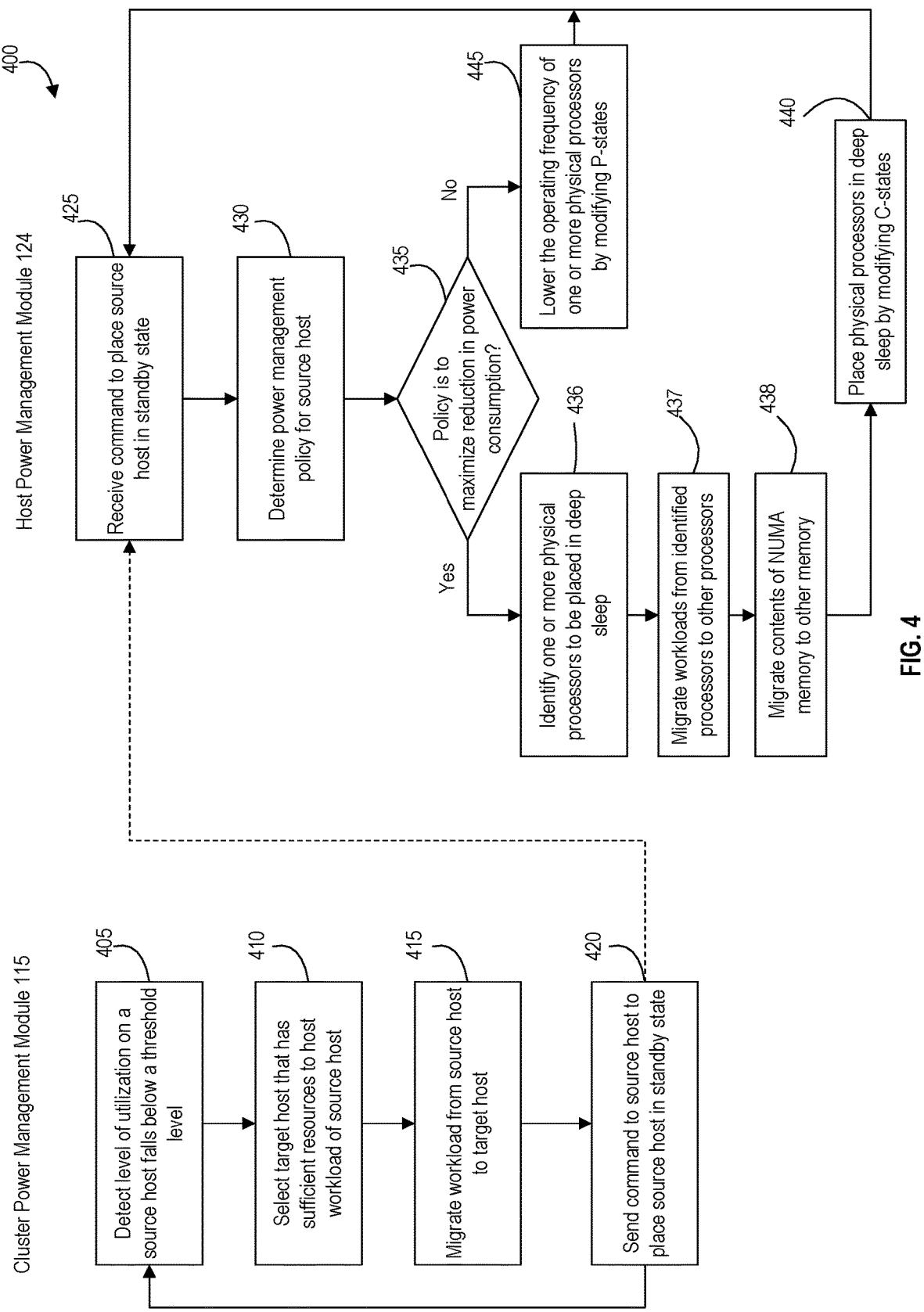
FIG. 4 is a flow diagram depicting a method for managing power consumptions by hosts in a cluster computing environment, according to one or more embodiments.

FIG. 4 is a flow diagram depicting a method 400 for managing power consumption by hosts in a cluster computing environment. Method 400 is executed in a cooperative manner by a power manager for a computing cluster, such as cluster power management module 115, and by a power manager for an individual host computer, such as host power management module 124. It should be noted that, in the embodiment depicted in FIG. 4, cluster power management module 115 and host power management module 124 operate asynchronously with respect to one another.

Method 400 begins at step 405, where cluster power management module 115 detects that the system utilization for a host computer that executes in the cluster falls short of some threshold level. According to embodiments, cluster power management module 115 monitors individual hosts (such as the host 120 depicted in FIG. 1) for CPU usage, memory usage, network usage, and the level of activity on one or more storage networks connected to the host. For example, cluster management server 115 monitors a host 120 and detects that the level of CPU utilization falls below 25 percent, which means that the CPUs on the host are idle three quarters of the time.

Having determined that a host 320 (referred to in FIG. 4 as a "source" host) has a utilization that falls below some threshold value, cluster management server 115 then selects, at step 410, a target host that has sufficient resources to host a current workload for the source host. In order to select such a target host, cluster power management module 115 determines that the target host has the required CPU capacity to run the workload currently executing on the source host, as well as the required memory capacity. That is, if a candidate target host is already, itself, overburdened because of its current workload, then cluster power management module 115 would not select such a candidate host as a target host for hosting the workload of the source host. Moreover, cluster power management module 115 also determines whether the target host has sufficient network capacity and connectivity in order to enable the workload of the source host to execute properly on the target host. For example, in the computing system 100 depicted in FIG. 1, the workloads executing on each of the hosts 320 comprise VMs. Thus, in order for one or more VMs on one host 320 to execute properly on another host 320, cluster power management module 115 determines whether the target host 320 connects to the required network infrastructure (i.e., virtual and physical network switches).

After selecting a target host for hosting the workload of the source host, cluster power management module 115, at step 415, migrates the workload from the source host to the target host. In one or more embodiments, where the workload comprises VMs executing on the source host, cluster power management module 115 invokes a virtual machine live migration product, such as vMotion®, which is distributed as a part of the vSphere® virtualization platform by VMware, Inc. Other methods of migrating virtual machines and applications in real time are also contemplated and within the scope of the present invention.

After performing the migration of the workload from the source host to the target host, cluster power management module 115, at step 420, sends one or more commands to the source host (from which the workload has just been migrated) to place the source host in a low power consumption state. As shown in the embodiment of FIG. 4, the command is sent by cluster power management module 115 to host power management module 124. As described earlier, host power management module 124 executes within hypervisor 122 on the source host (e.g., one of hosts 320 in FIG. 1). In embodiments, cluster power management module 124 transmits the command to host power management module 124 via management agent 123. That is, management agent 123 (which also runs as a process within hypervisor 122) receives the command and forwards the command to host power management module 124. After transmitting the command, cluster power management module 115 returns to step 405, where cluster power management module 115 again detects whether the utilization of one or more hosts in computing system 100 falls below a threshold value.

As shown in FIG. 4, host power management module 124, at step 425, receives the command transmitted by cluster power management module 115 to place the source host in a low power consumption state. At step 430, host power management module 124 determines a power management policy for the source host. Power management policies provide guidance to host power management module 124 on how to optimally conserve power on the host. Power management policies are stored with other system configuration data for the host. For example, a power management policy may specify that host power consumption is to be reduced while having little or no impact on performance. This is referred to as a "balanced policy." A balanced policy uses an algorithm that exploits the P-states of one or more CPUs on the source host. That is, the frequency at which the processor operates (and, as a result, the voltage applied to the processor) is reduced in discrete increments. This is achieved by lowering the P-state of the processor from P0 to, for example, P1.

Another power management policy may be referred to as a "low power" policy. This power policy is designed to more aggressively reduce host power consumption through the use of deep C-states. However, this is performed the risk of reduced host performance. Other intermediate policies (such as a combination of adjusting P-states and C-states of processors on the host) are within the scope of the present invention.

At step 435, host power management module 124 determines whether the current policy in effect is to maximize reduction in power consumption. If the current policy is to maximally reduce power consumption, then, at step 436, host power management module 124 identifies one or more physical processors on the source host that are to be placed into a deep sleep state. At step 437, host power management module 124 migrates any workloads currently executing on the identified physical processors (such as an application or operating system process) to other processors on the source host that are not to be placed in a sleep (or reduced power) mode. Next, at step 438, host power management module 124 migrates the contents of any local (i.e., NUMA) memory corresponding to the identified processors to other memory of the source host, where the other memory is not associated with a processor that is to be placed in a low power consumption state. At step 440, having migrated the workloads and data from the processors that are to be placed in a low power consumption mode, then host power management module 124 places the identified processors in the low power consumption mode by, for example, modifying the C-state of each identified processor.

However, if the power management policy that is currently in effect is not to maximally reduce power consumption, then host power management module 124, at step 445, lowers the operating frequency of one or more physical processors in the source host by modifying the P-states thereof. It should be noted that the choice of whether the reduction in power consumption is to be maximum reduction is present in one embodiment. In other embodiments, host power management module 124 makes a choice among several customized power management policies, where each policy may specifies that only certain processors may be placed in a deep sleep state by modifying C-states, while other processors may be adjusted to conserve power by modification of the processors' P-state. For example, certain processors may execute virtual machines that have virtual CPUs with an affinity to a certain processor. In such a case, the power management policy may specify that a CPU to which one or more virtual CPUs have affinity cannot be placed into a sleep mode by modifying the C-state of the CPU because, as mentioned earlier, there is additional latency in returning the processor from a sleep mode.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method of managing power consumption by a first host included in a plurality of hosts in a clustered computing system comprising:
   detecting that a utilization level of the first host falls below a threshold value;
   in response to detecting that the utilization level falls below the threshold value, migrating one or more workloads executing on the first host to a second host by causing at least one virtual machine executing the one or more workloads to be executed on the second host; and
   issuing a command to the first host for the first host to consume less power while the first host remains powered on, wherein the command causes the first host to cause one or more processors to operate at a reduced clock frequency.

2. The method of claim 1, further comprising determining that the second host has sufficient resources to execute the one or more workloads executing on the first host, wherein migrating to the second host is performed in response to detecting that the utilization level of the first host falls below the threshold value and determining that the second host has sufficient resources to execute the one or more workloads.

3. The method of claim 1, wherein the command causes the first host to change a current power state of the one or more processors to a second power state, and the second power state causes power to be removed from one or more components of the one or more processors.

4. The method of claim 1, further comprising migrating data from a first memory associated with the one or more processors to a second memory associated with one or more additional processors of the first host that are not placed in a sleep state.

5. The method of claim 1, wherein the command causes the first host to select a first power management policy for placing one or more processors of the first host in a sleep state or a second power management policy for operating the one or more processors at a reduced frequency.

6. The method of claim 1, wherein the at least one virtual machine is executing at least one application container utilizing a virtualization service of an operating system executed by the first host.

7. The method of claim 1, wherein the command causes the first host to reduce a voltage applied to the one or more processors.

8. A non-transitory computer-readable medium that stores instructions for managing power consumption by a first host included in a plurality of hosts of a clustered computing system, the instructions, when executed, causes a computing device to at least:
   detect that a utilization level of the first host falls below a threshold value;
   in response to detecting that the utilization level falls below the threshold value, migrate one or more workloads executing on the first host to a second host by causing at least one virtual machine executing the one or more workloads to be executed on the second host; and issue a command to the first host for the first host to consume less power while the first host remains powered on, wherein the command causes the first host to cause one or more processors to operate at a reduced clock frequency.

9. The non-transitory computer-readable medium of claim 8, wherein the instructions cause the computer to at least determine that the second host has sufficient resources to execute the one or more workloads executing on the first host, wherein migrating to the second host is performed in response to detecting that the utilization level of the first host falls below the threshold value and determining that the second host has sufficient resources to execute the one or more workloads.

10. The non-transitory computer-readable medium of claim 8, wherein the command causes the first host to change a current power state of the one or more processors to a second power state, and the second power state causes power to be removed from one or more components of the one or more processors.

11. The non-transitory computer-readable medium of claim 8, wherein the command causes the first host to select a first power management policy for placing one or more processors of the first host in a sleep state or a second power management policy for operating the one or more processors at a reduced frequency.

12. The non-transitory computer-readable medium of claim 8, wherein the instructions further cause the computing device to migrate data from a first memory associated with the one or more processors to a second memory associated with one or more additional processors of the first host that are not placed in a sleep state.

13. The non-transitory computer-readable medium of claim 8, wherein the one or more virtual machines are executing at least one application container utilizing a virtualization service of an operating system executed by the first host.

14. The non-transitory computer-readable medium of claim 8, wherein the command causes the first host to reduce a voltage applied to the one or more processors.

15. A clustered computing system, comprising:
a management server; and
a plurality of hosts including a first host, each of the plurality of hosts executing one or more workloads, wherein the management server executes instructions causing the management server to at least:
detect that a utilization level of the first host falls below a threshold value;
in response to detecting that the utilization level falls below the threshold value, migrate one or more workloads executing on the first host to a second host by causing at least one virtual machine executing the one or more workloads to be executed on the second host; and
issue a command to the first host for the first host to consume less power while the first host remains powered on, wherein the command causes the first host to cause one or more processors to operate at a reduced clock frequency.

16. The clustered computing system of claim 15, wherein the instructions cause the management server to at least determine that the second host has sufficient resources to execute the one or more workloads executing on the first host, wherein migrating to the second host is performed in response to detecting that the utilization level of the first host falls below the threshold value and determining that the second host has sufficient resources to execute the one or more workloads.

17. The clustered computing system of claim 15, wherein the command causes the first host to change a current power state of the one or more processors to a second power state, and the second power state causes power to be removed from one or more components of the one or more processors.

18. The clustered computing system of claim 15, wherein the command causes the first host to select a first power management policy for placing one or more processors of the first host in a sleep state or a second power management policy for operating the one or more processors at a reduced frequency.

19. The clustered computing system of claim 15, wherein the instructions further cause the management server to migrate data from a first memory associated with the one or more processors to a second memory associated with one or more additional processors of the first host that are not placed in a sleep state.

20. The clustered computing system of claim 15, wherein the command causes the first host to reduce a voltage applied to the one or more processors.

* * * * *